US007310094B2

(12) United States Patent
Baek

(10) Patent No.: US 7,310,094 B2
(45) Date of Patent: Dec. 18, 2007

(54) LIQUID CRYSTAL DISPLAY AND DRIVING METHOD THEREOF

(75) Inventor: Jong Sang Baek, Seoul (KR)

(73) Assignee: LG Phillips LCD Co., Ltd, Seoul (KR)

( * ) Notice: Subject to any disclaimer, the term of this patent is extended or adjusted under 35 U.S.C. 154(b) by 11 days.

(21) Appl. No.: 10/314,253

(22) Filed: Dec. 9, 2002

(65) Prior Publication Data

US 2003/0085860 A1 May 8, 2003

Related U.S. Application Data

(63) Continuation of application No. 09/651,261, filed on Aug. 30, 2000, now Pat. No. 6,525,720.

(30) Foreign Application Priority Data

Jul. 6, 2000 (KR) .............................. 2000-38469

(51) Int. Cl.
*G06F 3/038* (2006.01)

(52) U.S. Cl. ......................... 345/213; 345/87; 345/211

(58) Field of Classification Search .................. 345/87, 345/99, 100, 211–213
See application file for complete search history.

(56) References Cited

U.S. PATENT DOCUMENTS 4,758,831 A * 7/1988 Kasahara et al. ........... 340/805
4,947,264 A * 8/1990 Narusawa ................... 358/337
5,311,316 A * 5/1994 Sato ........................... 348/584
5,331,342 A * 7/1994 Shimatani et al. .......... 346/108
5,335,074 A * 8/1994 Stec ........................... 348/537
5,731,798 A * 3/1998 Shin ............................ 345/99

(Continued)

FOREIGN PATENT DOCUMENTS

JP 9-191435 7/1997

(Continued)

*Primary Examiner*—Richard Hjerpe
*Assistant Examiner*—Kimnhung Nguyen
(74) *Attorney, Agent, or Firm*—McKenna Long & Aldridge LLP

(57) ABSTRACT

A liquid crystal display device that are adapted to display a certain information to a user when no signal is input after a power was applied to the liquid crystal display device. In the device, a liquid crystal display panel has pixel electrodes arranged in a matrix type. A timing controller generates and outputs control signals for driving the liquid crystal display panel in response to a timing synchronizing signal inputted from the exterior thereof, and re-arranges and outputs an input data. A drive circuit is connected between the liquid crystal display panel and the timing controller to display a data inputted from the timing controller on the liquid crystal display panel in response to the control signal. An oscillator generates a pre-synchronizing signal having a desired frequency to apply the same to the timing controller. A signal presence determiner compares the timing synchronizing signal with the pre-synchronizing signal to generate a determining signal indicating an input existence of the timing synchronizing signal. A control signal generator generates a control signal on the basis of the pre-synchronizing signal in response to a determining signal indicating no input of the timing synchronizing signal. A data storage device stores a certain picture data and outputs the picture data to the drive circuit in response to the determining signal indicating no input of the timing synchronizing signal.

5 Claims, 7 Drawing Sheets

U.S. PATENT DOCUMENTS

| | | | |
|---|---|---|---|
| 5,757,365 | A | 5/1998 | Ho |
| 5,864,336 | A | 1/1999 | Yano |
| 6,020,879 | A | 2/2000 | Nakabayashi |
| 6,069,619 | A | 5/2000 | Kim |

FOREIGN PATENT DOCUMENTS

| | | |
|---|---|---|
| JP | 10-319916 | 12/1998 |

* cited by examiner

LIQUID CRYSTAL DISPLAY AND DRIVING METHOD THEREOF

This application is a Continuation of application Ser. No. 09/651,261 filed on Aug. 30, 2000, now U.S. Pat. No. 6,525,720.

BACKGROUND OF THE INVENTION

1. Field of the Invention

This invention relates to a liquid crystal display, and more particularly to a liquid crystal display device and a driving method thereof that are adapted to display a certain information to a user when no signal is input after a power was applied to the liquid crystal display device.

2. Description of the Related Art

Generally, a liquid crystal display (LCD) has been employed a notebook PC, an office automation equipment and an audio/video equipment, etc. owing to advantages of a small dimension, a thin thickness and a low power consumption. In particular, an active matrix liquid crystal display using thin film transistors (TFT's) as switching devices is suitable for displaying a dynamic image.

FIG. 1 is a block diagram showing a configuration of the conventional LCD. In FIG. 1, an interface part 10 receives a data (RGB data) and control signals (e.g., an input clock, a horizontal synchronizing signal, a vertical synchronizing signal and a data enable signal) inputted from a driving system such as a personal computer (not shown) to apply them to a timing controller 12. A low voltage differential signal (LVDS) interface and a transistor transistor logic (TTL) interface are largely used for a data and control signal transmission to the driving system. Such interfaces may be integrated into a single chip along with the timing controller 12 by collecting each function of them.

The timing controller 12 takes advantages of a control signal inputted via the interface 10 to produce control signals for driving a data driver 18 consisting of a plurality of drive IC's (not shown) and a gate driver 20 consisting of a plurality of gate drive IC's (not shown). Also, the timing controller 12 transfers a data inputted from the interface 10 to the data driver 18. A reference voltage generator 16 generates reference voltages of a digital to analog converter (DAC) used in the data driver 18, which are established by a producer on a basis of a transmissivity to voltage characteristic of the panel. The data driver 18 selects reference voltages of an input data in response to control signals from the timing controller 12 and applies the selected reference voltage to the liquid crystal display panel 2, thereby controlling a rotation angle of the liquid crystal. The gate driver 20 makes an on/off control of the thin film transistors (TFT's) arranged on the liquid crystal panel 22 in response to the control signals inputted from the timing controller 12. Also, the gate driver 20 allows the analog image signals from the data driver 18 to be applied to each pixel connected to each TFT. A power voltage generator 14 supplies an operation voltage to each element, and generates a common electrode voltage and applies it to the liquid crystal panel 22.

FIG. 2 is a schematic block diagram showing a configuration of the timing controller in FIG. 1. In FIG. 2, the timing controller 12 includes a control signal generator 22 and a data signal generator 24. The timing controller 12 receives a horizontal synchronizing signal, a vertical synchronizing signal, a data enable signal, a clock and a data (R,G,B). The vertical synchronizing signal represents a time required for displaying one frame field. The horizontal synchronizing signal represents a time required for displaying one line of the field. Thus, the horizontal synchronizing signal includes pulses corresponding to the number of pixels included in one line. The data enable signal represents a time supplying the pixel with a data.

The data signal generator 24 rearranges a data so that desired bits of data (R,G,B) inputted from the interface 10 can be supplied to the data driver 18. The control signal generator 22 receives the horizontal synchronizing signal, the vertical synchronizing signal, the data enable signal and the clock signal to generate various control signals and apply them to the data driver 18 and the gate driver 20. The control signals required for the data driver 18 and the gate driver 20 will be described below. Herein, the control signals used commonly other than the control signals required specially will be described.

The control signals required for the data driver 18 include source sampling clock (SSC), source output enable (SOE), source start pulse (SSP) and liquid crystal polarity reverse (POL) signals, etc. The SSC signal is used as a sampling clock for latching a data in the data driver 18, and which determines a drive frequency of the data drive IC. The SOE signal transfer a data latched by the SSC signal to the liquid crystal panel. The SSP signal is a signal notifying a latch or sampling initiation of the data during one horizontal synchronous period. The POL signal is a signal notifying the positive or negative polarity of the liquid crystal for the purpose of making an inversion driving of the liquid crystal.

The control signals required for the gate driver 20 include gate shift clock (GSC), gate output enable (GOE) and gate start pulse (GSP) signals, etc. The GSC signal is a signal determining a time when a gate of the TFT is turned on or off. The GOE signal is a signal controlling an output of the gate driver 20. The GSP signal is a signal notifying a first drive line of the field in one vertical synchronizing signal.

The control signals inputted to the data driver 18 and the gate driver 20 as mentioned above are generated by the control signals inputted from the interface 10. Thus, if no control signal is input from the interface 10, then the timing controller 12 fails to generate a control signal. In other words, if any control signals are not inputted from the interface 10 in a power-on state, then the liquid crystal panel 2 does not display a picture. If a state in which the liquid crystal panel 2 does not display a picture upon power-on is sustained, then the liquid crystal is deteriorated to leave traces. Such deteriorated traces is viewed even when the LCD make a normal display to cause a trouble of the LCD.

SUMMARY OF THE INVENTION

Accordingly, it is an object of the present invention to provide a liquid crystal display and a driving method thereof that is adapted to display a certain information to a user when no signal is input after a power was applied.

In order to achieve these and other objects of the invention, a liquid crystal display device according to one aspect of the present invention includes a liquid crystal display panel having pixel electrodes arranged in a matrix type; a timing controller for generating and outputting control signals for driving the liquid crystal display panel in response to a timing synchronizing signal inputted from the exterior thereof and for re-arranging and outputting an input data; a drive circuit connected between the liquid crystal display panel and the timing controller to display a data inputted from the timing controller on the liquid crystal display panel in response to the control signal; an oscillator for generating a pre-synchronizing signal having a desired frequency to apply the same to the timing controller; a signal presence determiner for comparing the timing synchronizing signal with the pre-synchronizing signal to generate a determining signal indicating an input existence of the timing synchronizing signal; a control signal generator for generating a control signal on the basis of the pre-synchronizing signal in response to a determining signal indicating no input of the timing synchronizing signal; and a data storage device for storing a certain picture data and outputting the picture data to the drive circuit in response to the determining signal indicating no input of the timing synchronizing signal.

A liquid crystal display device according to another aspect of the present invention includes a liquid crystal display panel having pixel electrodes arranged in a matrix type; an oscillator for generating a reference clock having the same frequency as a horizontal synchronizing signal and a pre-synchronizing signal having the same frequency as a vertical synchronizing signal; a synchronization detector for comparing a data enable signal inputted from the exterior thereof with the reference clock to generate a synchronization-detecting signal indicating an input existence of the reference clock; a signal presence determiner for comparing the synchronization-detecting signal with the pre-synchronizing signal to generate a determining signal indicating an input presence of the data enable signal; a control signal generator for receiving the vertical synchronizing signal inputted from the exterior thereof and the pre-synchronizing signal to generate a control signal on the basis of the pre-synchronizing signal in response to the determining signal when the data enable signal is not inputted; a data storage device for storing a certain picture data and outputting the picture data to a drive circuit in response to the determining signal; and said drive circuit for receiving the picture data inputted from the data storage device to display the same on the liquid crystal panel in response to the control signal.

A method of driving a liquid crystal display device according to still another aspect of the present invention includes the steps of generating a pre-synchronizing signal having a desired frequency by a timing controller; comparing the timing synchronizing signal with the pre-synchronizing signal to generate a determining signal indicating an input existence of a timing synchronizing signal; generating a control signal on the basis of the pre-synchronizing signal in response to the determining signal indicating no input of the timing synchronizing signal; and outputting a desired picture data to a drive circuit in response to the determining signal.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
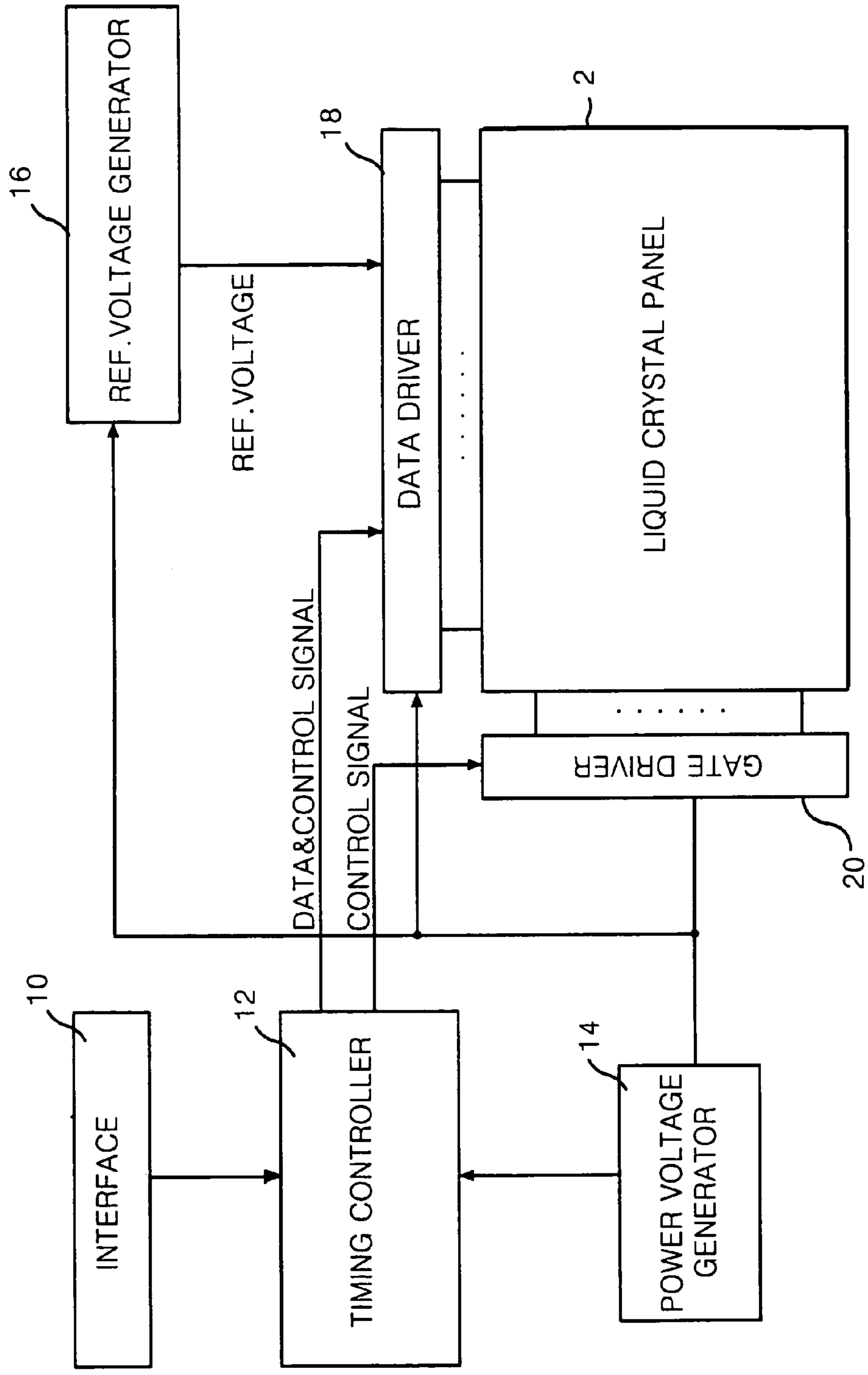
FIG. 1 PRIOR ART
FIG. 1 is a block diagram showing a configuration of a general liquid crystal display.
Figure 2:
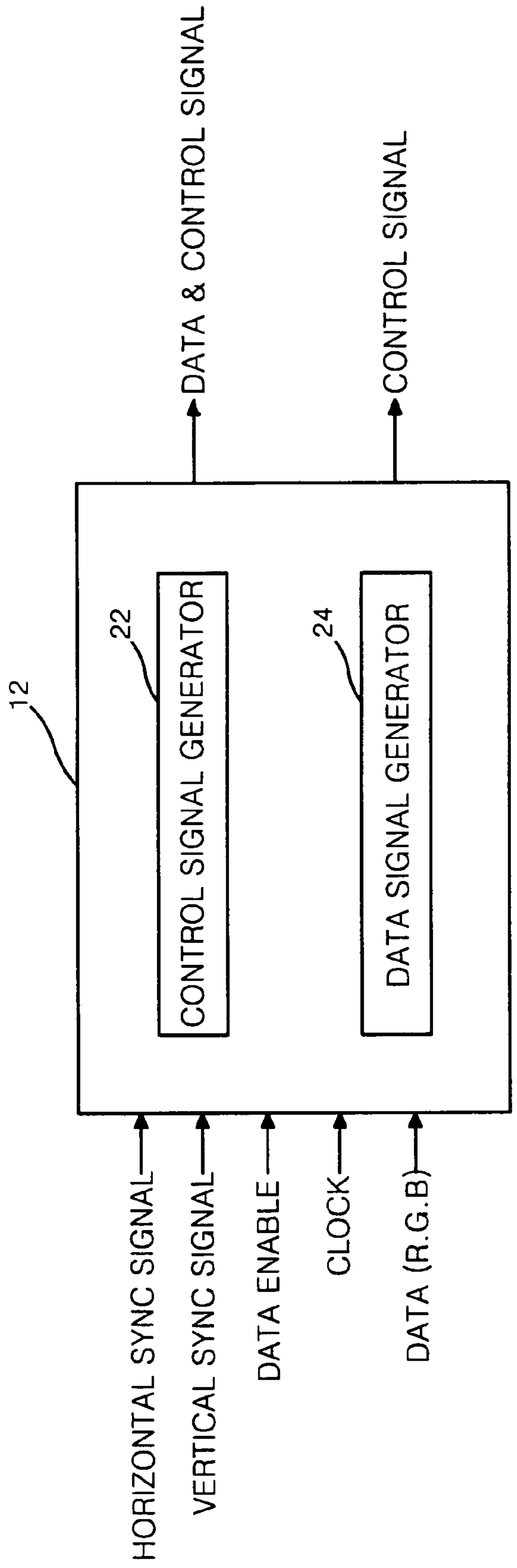
FIG.2 PRIOR ART
FIG. 2 is a schematic block diagram showing a configuration of the timing controller in FIG. 1.
Figure 3:
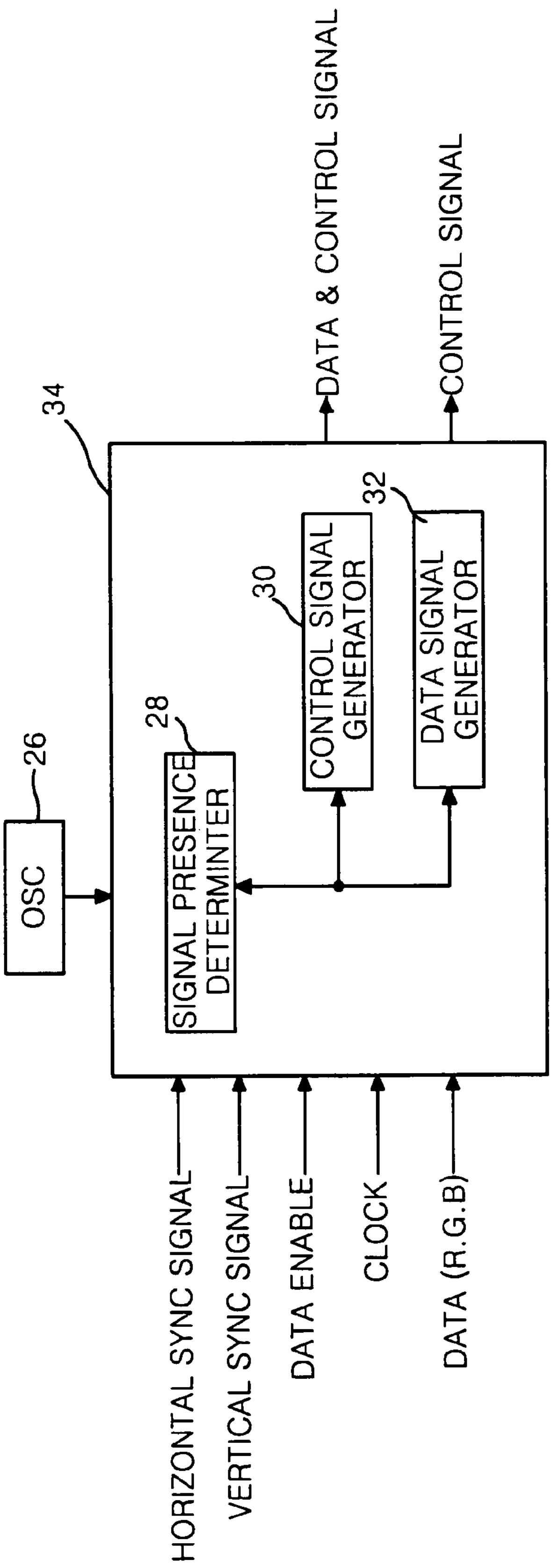
FIG. 3 is a schematic block diagram showing a configuration of a timing controller according to an embodiment of the present invention.

Referring to FIG. 3, there is shown a timing controller according to an embodiment of the present invention. The timing controller 34 includes a control signal generator 30 for receiving timing synchronizing signals, such as a horizontal synchronizing signal, a vertical synchronizing signal, a data enable signal and a clock pulse, etc., from an interface 10 to generate control signals to be applied to a data driver 18 and a gate driver 20, a data signal generator 32 for receiving a data (R,G,B) inputted from the interface 10 to align the same and supplying the aligned data to the data driver 18, a signal presence determiner 28 for monitoring an application state of various control signals inputted from the interface 10, and an oscillator 26 for applying a desired frequency of pre-synchronizing signal to the signal presence determiner 28. The control signal generator 30 receives the horizontal synchronizing signal, the vertical synchronizing signal, the data enable signal and the clock from the interface 10 to generate various control signals for driving the liquid crystal display panel, and applies the generated control signals to the data driver 18 and the gate driver 20. At this time, as an example, the control signal generator 30 generates source sampling clock (SSC), source output enable (SOE), source start pulse (SSP) and liquid crystal polarity inverse (POL) signals, etc. on the basis of the input vertical synchronizing signal to apply the same to the data driver 18. Also, the control signal generator 30 generates gate shift clock (GSC), gate output enable (GOE), gate start pulse (GSP) signals, etc. on the basis of the input vertical synchronizing signal to apply the same to the gate driver 20. Alternatively, the control signal generator 30 may generate the above-mentioned control signals for driving the liquid crystal display panel on the basis of a data enable signal.

The data signal generator 32 receives a data (R,G,B) from the interface 10 and re-arranges the received data in such a manner to be received to the liquid crystal display panel 2, thereby applying the same to the data driver 18. The oscillator 26 generates a pre-synchronizing signal having the same frequency as the vertical synchronizing signal to apply it to the signal presence determiner 28. The oscillator 26 may be installed at the exterior or the interior of the timing controller 34.

Hereinafter, an operation when there does not exist an input signal from the exterior will be described. First, the signal presence determiner 28 monitors an application of the control signals outputted from the interface 10. An operation process of the signal presence determiner 28 will be described in detail with reference to FIG. 4. Herein, it is assumed that a frequency of the vertical synchronizing signal inputted from the interface 10 is 60 Hz, and a signal input presence is determined on the basis of the vertical synchronizing signal in FIG. 4 as an example.

Figure 4:
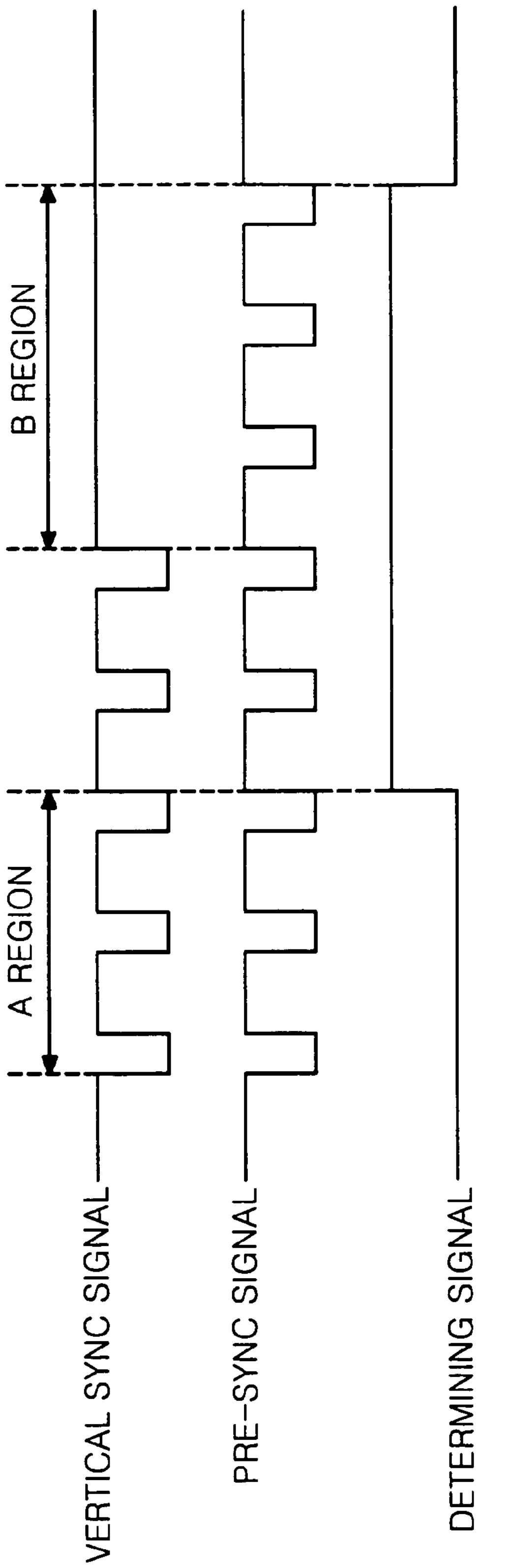
FIG. 4 is waveform diagrams for showing a generation process of a determining signal generated from the signal presence determiner in FIG. 3.

Referring now to FIG. 4, the signal presence determiner 28 receives a vertical synchronizing signal from the interface 10 and, at the same time, receives a pre-synchronizing signal having the same frequency (i.e., 60 Hz) as the vertical synchronizing signal from the oscillator 26. The signal presence determiner 28 receiving the vertical synchronizing signal and the pre-synchronizing signal compares the vertical synchronizing signal with the pre-synchronizing signal in the A region in FIG. 4 supplied with the vertical synchronizing signal to apply a high-state determining signal indicating an effective signal input to the control signal generator 30 if the vertical synchronizing signal is inputted during a desired period (e.g., three periods). The control signal generator 30 supplied with a high-state determining signal receives the vertical synchronizing signal applied from the interface 10. The following operation is identical to a generation operation of a general control signal.

Figure 5:
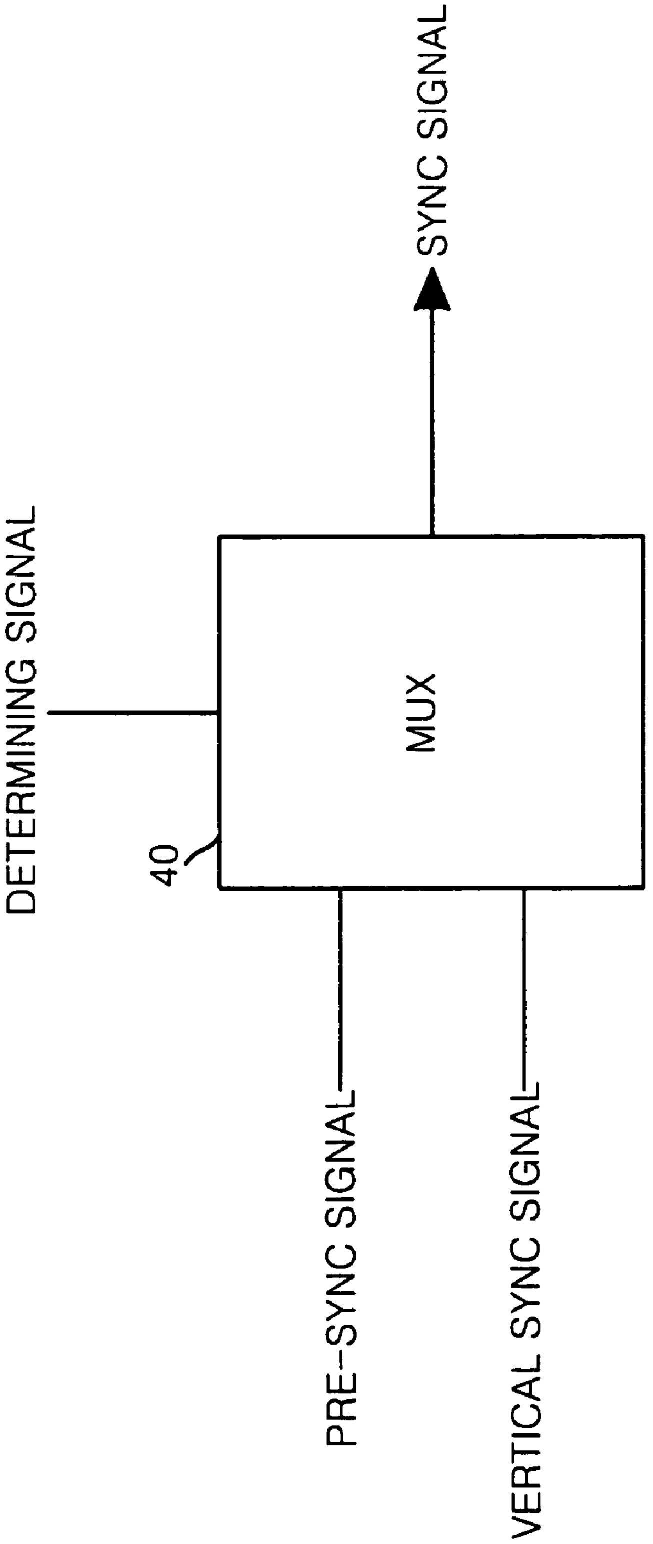
FIG. 5 represents a multiplexor installed in the timing controller shown in FIG. 3.

Otherwise, the signal presence determiner 28 compares the vertical synchronizing signal with the pre-synchronizing signal in the B region in FIG. 4 to apply a low-state determining signal to the control signal generator 30 if the vertical synchronizing signal is not inputted during a desired period (e.g., three periods). The control signal generator 30 supplied with the low-state determining signal receives the pre-synchronizing signal from the oscillator 26 to display a full black, a full white or a certain picture information on the liquid crystal display panel 2. To this end, the control signal generator 30 includes a multiplexor (MUX) 40 as shown in FIG. 5. The MUX 40 is supplied with the pre-synchronizing signal, the vertical synchronizing signal and the determining signal, and selects and outputs the pre-synchronizing signal or the vertical synchronizing signal as a synchronizing signal in response to an input state of the determining signal. At this time, if a high-state determining signal is inputted, the MUX 40 selects and outputs the vertical synchronizing signal; whereas, if a low-state determining signal is inputted, the MUX 40 selects and outputs the pre-synchronizing signal. Then, the control signal generator 30 generates and outputs each control signal on the basis of the vertical synchronizing signal or the pre-synchronizing signal outputted from the MUX 40. The data signal generator 32 has stored, in advance, a data for displaying a certain picture with at least one frame. A ROM used as a storage device may be integrated within a block of the data signal generator 32 in the timing controller 34, or employed by an external flash memory, etc.

The data signal generator 32 outputs a certain data stored in advance when a low-state determining signal is inputted, in response to an input state of the determining signal. In this case, a black data or a text data indicating a signal no-input state, etc. is used as the certain data.

Figure 6A:
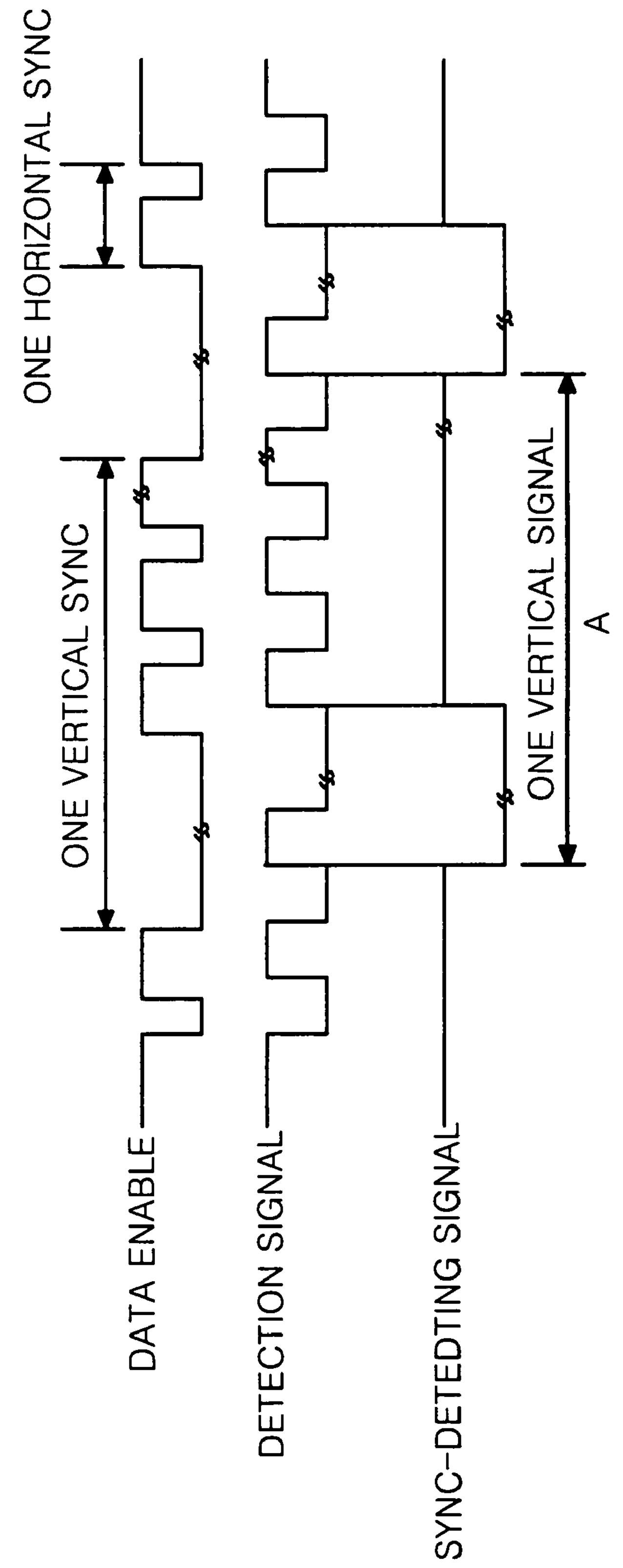
FIG. 6A is waveform diagrams for showing a generation process of a determining signal generated by another embodiment of the present invention.
Figure 6B:
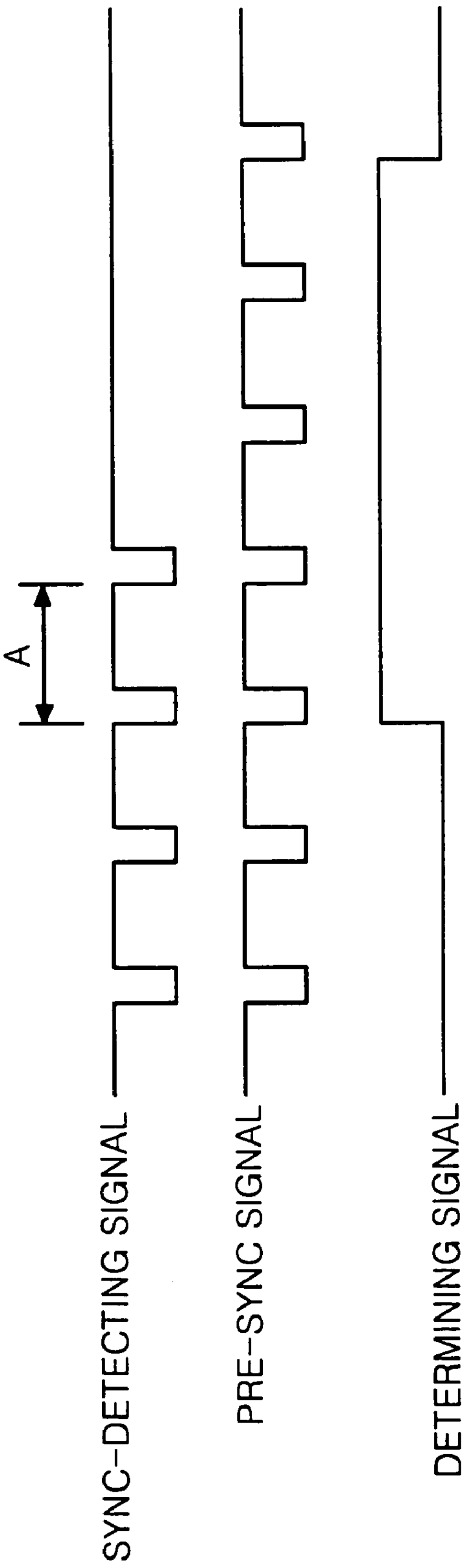
FIG. 6B is waveform diagrams for showing a process of generating a determining signal using the synchronization-detecting signal in FIG. 6A.

In another embodiment of the present invention, a data enable signal may be used to determine a presence of the control signal applied from the interface 10 to the timing controller 34. Referring to FIG. 6A, the signal presence determiner 28 receives a data enable signal from the interface 10 and a detection signal having the same frequency as the horizontal synchronizing signal from the oscillator 26. The signal presence determiner 28 receiving the data enable signal and the detection signal compares the detection signal with the data enable signal to generate a synchronization-detecting signal indicating the detected result. Referring to FIG. 6B, the signal presence determiner 28 receives a pre-synchronizing signal having the same frequency as the vertical synchronizing signal from the oscillator 26 to compare it with the synchronization-detecting signal. The signal presence determiner 28 compares the synchronization-detecting signal with the pre-synchronizing signal to apply a low-state determining signal to the control signal generator 30 and the data signal generator 32 if the synchronization-detecting signal shows a state that fails to detect an input of the data enable signal during a desired period (e.g., three periods). The control signal generator 30 and the data signal generator 32 supplied with the low-state determining signal receives a pre-synchronizing signal from the oscillator 26 to display a full black, a full white or a certain information on the liquid crystal display panel 2.

As described above, according to the present invention, the timing controller further includes a signal presence determiner to monitor an existence of the control signal inputted from the interface. Accordingly, when a control signal is not inputted from the interface, any one of a certain user information, a full black and a full white can be displayed on the liquid crystal panel to prevent a deterioration of the liquid crystal.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of driving a liquid crystal display device, comprising:

receiving a plurality of timing synchronization signals from an interface;

generating a pre-synchronizing signal, the pre-synchronizing signal having a frequency identical to a first one of the plurality of the received timing synchronization signals;

generating one of a first determining signal when the first one of the plurality of received timing synchronization signals is received from the interface during a first predetermined period of the pre-synchronization signal and a second determining signal when the first one of the plurality of received timing synchronization signals is not received from the interface during a second predetermined period of the pre-synchronization signal; and generating control signals for driving a liquid crystal display device, wherein the control signals are based on a generation of one of the first and second determining signals, wherein control signals based on the generation of the first determining signal include the first one of the plurality of received timing synchronization signals, and wherein control signals based on the generation of the second determining signal include the pre-synchronization signal.

2. The method of driving a liquid crystal display device according to claim 1, wherein the control signals based on the generation of the second determining signal causes one of full black, full white, and predetermined picture information to be displayed on the liquid crystal display device.

3. The method of driving a liquid crystal display device according to claim 1, wherein the predetermined picture information is one of a black data and a text data indicating signal no-input state.

4. The method of driving a liquid crystal display device according to claim 1, wherein the first one of the plurality of received timing synchronization signals includes a vertical synchronizing signal.

5. A method of driving a liquid crystal display device according to claim 1, wherein the receiving a plurality of timing synchronization signals from an interface further comprises receiving a second one and a third one of the plurality of timing synchronization signals, the method further comprising:

generating a detection signal in response to receiving the second one of the plurality of received timing synchronization signals, the detection signal having a frequency identical to the third one of the plurality of received timing synchronization signals;

generating a combination signal, wherein the combination signal is generated at least in part by the detection signal and the second one of the plurality of received timing synchronization signals;

generating a third determining signal when the combination signal is not present during a third predetermined period of the pre-synchronizing signal; and generating control signals for driving the liquid crystal display device, wherein the control signals based on the generation of the third determining signal includes the second determining signal.

* * * * *